United States Patent [19]
Shultz

[11] 3,973,314
[45] Aug. 10, 1976

[54] SPRING COMPRESSION TOOL
[76] Inventor: William E. Shultz, 239 N. Main St., Lombard, Ill. 60148
[22] Filed: Aug. 21, 1975
[21] Appl. No.: 606,666

[52] U.S. Cl. .............................. 29/227; 267/61 S
[51] Int. Cl.² .................................. B23P 19/04
[58] Field of Search ............ 29/225, 227; 254/10.5; 24/73 HH, 263 PJ, 73 GC; 267/61 S, 61 R; 248/339, 340

[56] References Cited
UNITED STATES PATENTS

| | | | |
|---|---|---|---|
| 3,132,843 | 5/1964 | Brocato | 254/10.5 |
| 3,814,382 | 6/1974 | Castoe | 29/227 |

*Primary Examiner*—James L. Jones, Jr.

[57] ABSTRACT

An adjustable spring compression tool for use primarily in connection with the removal of springs form a vehicle chassis.

5 Claims, 3 Drawing Figures

U.S. Patent   Aug. 10, 1976   3,973,314
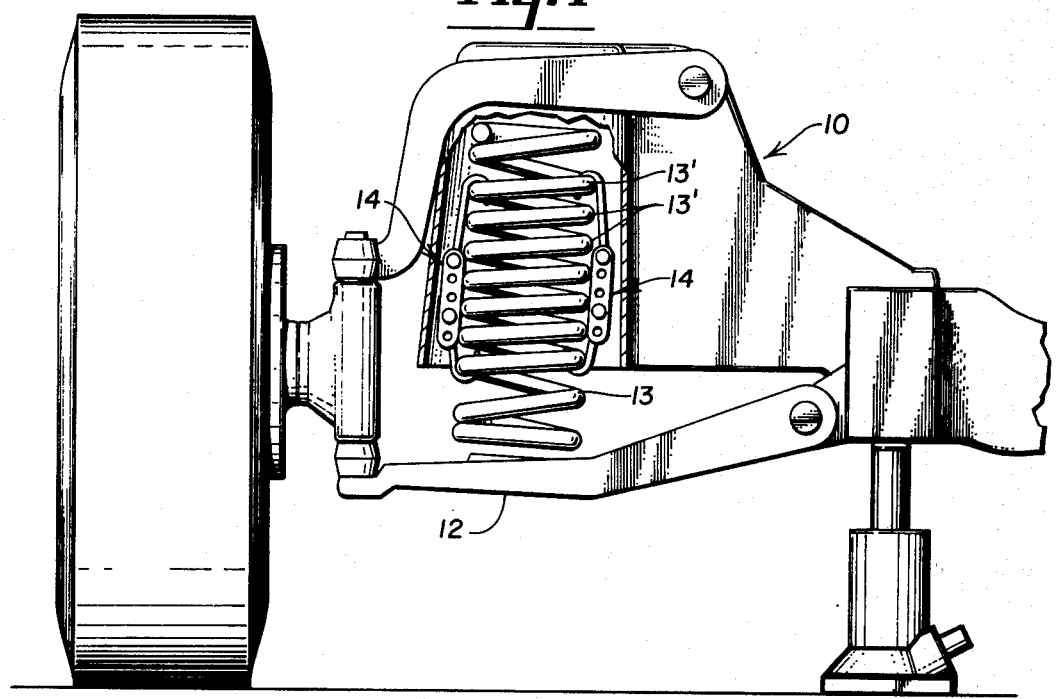
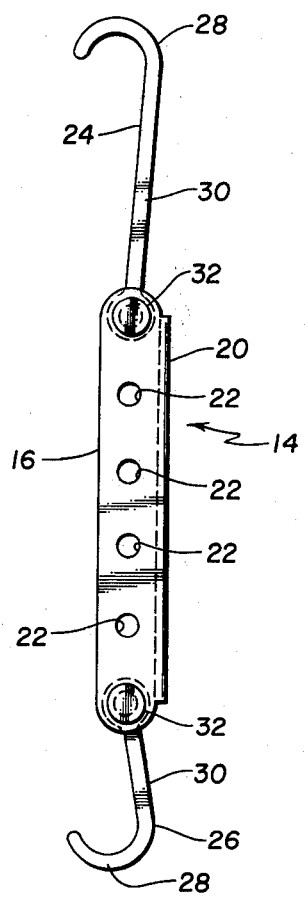
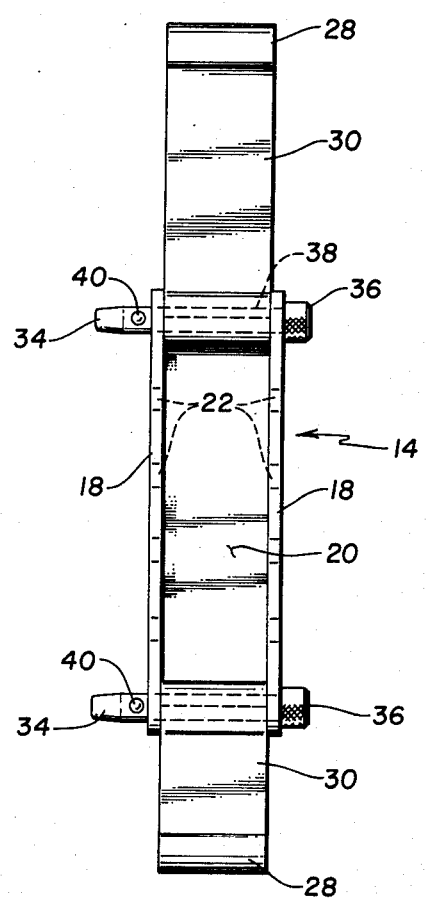

SPRING COMPRESSION TOOL

BACKGROUND OF THE INVENTION

This invention relates to a device for facilitating the removal of a spring from a frame or chassis of a vehicle.

In vehicle suspensions, such as automobiles and trucks, the wheels are mounted on rock levers or knuckles, and a coil spring is inserted between the levers and the vehicle chassis or frame. Under various circumstances it is necessary to remove the spring — to repair or replace the spring itself, to repair or replace parts of the suspension that may be damaged in a collision.

Generally, in order for the spring to be removed, it must first be compressed, then in some manner held under compression while it is removed. Various prior art tools have been used to compress and hold the spring. However, these tools have been generally unsatisfactory and also, in many cases, unsafe. Many prior art tools require the insertion of a bolt or other device longitudinally within the convolutions of the spring. Because of the tremendous force exerted by the spring on the tool, these tools have been known to fail, resulting not only in destruction of the tool itself, but also in injury to the mechanic performing the work. Heretofore, because of space limitations in most suspension systems around the periphery of the spring, no satisfactory, safe device for holding the spring in compression has been available.

BRIEF DESCRIPTION OF THE DRAWING

FIG. 1 is a fragmentary vertical section of a vehicle chassis and suspension means therefore, having a spring compression device disposed in spring compression position constructed according to an embodiment of this invention.

FIG. 2 is a side view of an individual hook tool showing the parts thereof.

FIG. 3 is an end view thereof.

SUMMARY OF THE INVENTION

The present invention provides a device which holds springs in compression on many different types of vehicles. It further provides a device which will firmly hold the spring under compression so that the spring will not accidently be permitted to expand while parts are being repaired or replaced, thereby making any front end job safer.

The invention achieves these advantages and overcomes the advantages of prior art devices by the provision of at least a pair of devices that hook individual convolutions of the spring from the outside of the spring. More particularly, each device has a longitudinal central body portion having a hook protruding from each end thereof. Means are provided to adjust the total length of the device to enable it to be used on many types and models of vehicles. Preferably, the central body portion of the device is in the form of a substantially U-shaped channel having a pair of opposed side walls and an end wall therebetween. The opposed side walls are provided with a plurality of aligned apertures adapted to receive hook restraining means in various positions.

Further objects and advantages of the invention will become apparent to those skilled in the art to which the invention relates from the following description of the preferred embodiments described with reference to the accompanying drawings forming a part of this specification.

DESCRIPTION OF THE PREFERRED EMBODIMENTS

Referring to the drawing, the vehicle chassis or frame is generally designated by the numeral 10. The numeral 12 generally designates a lower rock lever disposed below the frame 10 and carrying a wheel or axle (not shown). A coil compression spring 13 having individual convolutions 13' is interposed between the lever 12 and the frame 10.

The spring compression tool of my invention is generally designated by the numeral 14. In FIG. 1 it is shown in place for holding the spring in compression after the spring has been compressed by jacking the frame or other well-known means. The tool 14 comprises an elongated central body portion 16 which is preferably in the form of a U-shaped channel member. The channel member 16 has a pair of opposed side walls 18 connected by end wall 20. The side walls 18 have pairs of transversely aligned apertures 22.

Upper and lower hook members generally designated by the numerals 24 and 26 respectively are designed to protrude from either end of the central body portion 16. Each hook member 24 and 26 is substantially J-shaped in side view and has a curved end forming a hook 28, adapted to receive individual convolutions 13' of the spring 13, a shank 30 extending longitudinally from the hook 28, and an eyelet 32 formed at the opposite end of the shank 30.

Each hook 24 and 26 is preferably substantially rectangular in cross-section and is of sufficient width to withstand the forces exerted thereon after the means originally compressing the spring 13 are released. The upper hook 24 and lower hook 26 are substantially identical, except that the shank 30 of the upper hook 24 is substantially longer than lower hook 26.

Because of the limited space available between the spring 13 and the chassis 10 for inserting the tool on the spring 13, and at the same time to provide the desired strength, the dimensions of the hook members are very important. I have found that a width on the order of one inch, a thickness of ¼ inch perform very satisfactorily. The upper hook member 24 should be between 3½ inches and 4 inches long and the lower hook member 26 between 1½ inches and 2 inches long.

The hook members 24 and 26 are pivotally secured to the central body member 14 by means of pins 34. Each pin 34 has a head 36 which is preferably knurled, a shaft 38, and a spring loaded ball retainer 40 at the opposite end of shaft 38 to prevent accidental removal of the pin 34 from the apertures 22. The diameter of the shaft 38 is slightly smaller than the diameter of aligned apertures 22 in the central body portion 16 of the tool 14 so as to be received snugly by the apertures. The head 36 is slightly larger than the shaft 38 to limit extent of entry of the pin 34 into aperture 22.

In operation, the spring 13 is compressed in a suitable manner as mentioned above. The longer upper hook member 24 is pivotally attached to the central body portion 16 of one tool 14 by aligning the eyelet 32 of the hook member 24 with opposed apertures 22 in the side walls 18 and inserting the shaft 38 of the pin 34 through the aperture 22 in one side wall 18, the eyelet 32 and the aperture 22 in the other side wall. When the spring-load ball retainer 40 passes through the second aperture, it locks the pin 34 into place and accidental or inadvertent removal is prevented.

Depending on the clearances available in a particular vehicle, the hook 28 is placed over a convolution 13' of the spring 13 near the top thereof, or placed over a lower convolution 13' and then slid around convolutions progressively upwardly until the hook 28 is on a convolution near the top of the spring. The process is repeated with the second tool and it is left in place at a position 180° from the first tool on the periphery of the spring.

Because of the length of the upper hook member 24, the lower end of the channel 14 will extend far enough downwardly to be readily accessible for attachment of the lower hook member 26 in the same fashion, utilizing the highest possible pair of apertures 22. The compressive means is then released and the spring will extend slightly until the hooks are in full engagement with the spring. The spring is then held in compression and can easily be removed from the vehicle.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A spring compression tool comprising at least a pair of compression members adaptable for engagement with spaced convolutions of a coil spring, each of said compression members comprising an elongated central body portion having a pair of opposed side walls connected by a transverse cross member, the side walls having a plurality of aligned apertures; and an upper and lower hook member pivotally attached to said central body portion by means of pins extending through a pair of said aligned apertures, said hook members being adjustable longitudinally on said body portion.

2. The spring compression tool of claim 1 wherein each of said hook members is substantially J-shaped in side elevation, having a curved hook, a shank extending longitudinally from said hook, and an eyelet at the opposite end of said shank.

3. The spring compression tool of claim 2 wherein each of said upper hook members is substantially longer than each of said lower hook members.

4. The spring compression tool of claim 3 wherein each of said hook members is rectangular in cross section.

5. The spring compression tool of claim 4 wherein each of said pins comprises a head slightly larger than said apertures, a shaft portion slightly smaller than said apertures, and a spring loaded ball retainer to prevent inadvertent removal of said pin from said apertures.

* * * * *